United States Patent
Ariki et al.

(10) Patent No.: US 7,786,195 B2
(45) Date of Patent: Aug. 31, 2010

(54) SPECTACLE LENS AND POLYCARBONATE RESIN MOLDING MATERIAL FOR OPTICAL MOLDINGS

(75) Inventors: Jiro Ariki, Chiyoda-ku (JP); Seiichi Tanabe, Chiyoda-ku (JP)

(73) Assignee: Teijin Chemicals Ltd., Tokyo (JP)

( * ) Notice: Subject to any disclaimer, the term of this patent is extended or adjusted under 35 U.S.C. 154(b) by 608 days.

(21) Appl. No.: 11/667,098

(22) PCT Filed: Oct. 28, 2005

(86) PCT No.: PCT/JP2005/020253

§ 371 (c)(1),
(2), (4) Date: May 4, 2007

(87) PCT Pub. No.: WO2006/049228

PCT Pub. Date: May 11, 2006

(65) Prior Publication Data

US 2007/0299168 A1 Dec. 27, 2007

(30) Foreign Application Priority Data

Nov. 5, 2004 (JP) ............................. 2004-321741

(51) Int. Cl.
*C08K 5/3475* (2006.01)
*C08K 5/49* (2006.01)
*C08K 5/103* (2006.01)

(52) U.S. Cl. .................. 524/91; 524/126; 524/133; 524/311

(58) Field of Classification Search .............. 524/91, 524/111, 126, 133, 311, 106
See application file for complete search history.

(56) References Cited

U.S. PATENT DOCUMENTS

| | | | |
|---|---|---|---|
| 4,576,870 A | 3/1986 | Liebler et al. | |
| 5,108,835 A | 4/1992 | Hähnsen et al. | |
| 5,952,096 A | 9/1999 | Yamashita et al. | |
| 6,197,917 B1 * | 3/2001 | Kimura et al. | 528/196 |
| 2002/0115758 A1 | 8/2002 | Gorny et al. | |
| 2004/0152806 A1 * | 8/2004 | Koga et al. | 524/115 |
| 2007/0155867 A1 | 7/2007 | Ikari et al. | |

FOREIGN PATENT DOCUMENTS

| | | |
|---|---|---|
| CN | 1533414 | 9/2004 |
| JP | 62-146951 | 6/1987 |
| JP | 04-292661 | 10/1992 |
| JP | 6-35141 | 5/1994 |
| JP | 6-41162 | 6/1994 |
| JP | 07-092301 | 4/1995 |
| JP | 9-263694 | 10/1997 |
| JP | 9-291205 | 11/1997 |
| JP | 2001-192544 | 7/2001 |
| JP | 2003-231803 | 8/2003 |
| JP | 2003-231804 | 8/2003 |
| JP | 2003-231805 | 8/2003 |
| JP | 2003-301101 | 10/2003 |
| JP | 2003-327818 | 11/2003 |
| JP | 2004-027104 | 1/2004 |
| JP | 2004-027108 | 1/2004 |
| JP | 2004-083850 | 3/2004 |
| JP | 2004-131652 | 4/2004 |
| WO | 02/34825 | 5/2002 |
| WO | 03/095557 | 11/2003 |
| WO | 2005/069061 | 7/2005 |

OTHER PUBLICATIONS

Supplementary European Search Report (in the English language), dated Apr. 15, 2010, issued in corresponding European Application No. 05 80 0041.

* cited by examiner

*Primary Examiner*—Kriellion A Sanders
(74) *Attorney, Agent, or Firm*—Wenderoth, Lind & Ponack, L.L.P.

(57) ABSTRACT

A spectacle lens made of a polycarbonate resin composition which comprises (1) 100 parts by weight of a polycarbonate resin, (2) 0.05 to 0.5 part by weight of (A) at least one ultraviolet light absorber selected from the group consisting of 2-(2'-hydroxy-5'-methylphenyl)benzotriazole and 2-(2'-hydroxy-5'-tert-octylphenyl)benzotriazole, (3) 0.01 to 0.3 part by weight of (B) at least one ultraviolet light absorber selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotraizole)-2-ylphenol] and 2-[2-hydroxy-3,5-bis($\alpha,\alpha$-dimethylbenzyl)phenyl]-2H-benzotriazole, and (4) 0.01 to 0.5 part by weight of (C) a full ester of a tetravalent to octavalent aliphatic polyhydric alcohol having 5 to 30 carbon atoms and an aliphatic carboxylic acid having 10 to 22 carbon atoms, having an acid value of 4 to 20.

According to the present invention, the spectacle lens made of the above polycarbonate resin composition has molding heat resistance which enables it to be kept at a high temperature for a long time when the lens is formed by extrusion compression molding, a small change in hue when heat history such as re-extrusion is applied so as to recycle product waste and excellent releasability.

13 Claims, No Drawings

SPECTACLE LENS AND POLYCARBONATE RESIN MOLDING MATERIAL FOR OPTICAL MOLDINGS

TECHNICAL FIELD

The present invention relates to a spectacle lens made of a polycarbonate resin composition which is excellent in transparency, ultraviolet absorptivity and hue and to a polycarbonate resin molding material for optical moldings. More specifically, it relates to a polycarbonate resin molding material which has high releasability and excellent molding heat resistance and is so superior in reproduction property (re-melt moldability) that it is almost free from the yellowing of the resin even when it undergoes heat history in the molding of optical moldings.

The term "reproduction property" as used herein means that the hue of a resin rarely changes even when heat history such as re-extrusion is applied so as to recycle a polycarbonate resin molded article or waste thereof. That is, it means property that even when heat history is applied to a resin molded article (or waste thereof), its color rarely worsens and therefore, it can be recycled.

BACKGROUND ART

A polycarbonate resin has a high refractive index and excellent transparency and impact resistance and is now widely used as a raw material for lenses, especially spectacle lenses. Since polycarbonate resin spectacle lenses are thinner and lighter than conventional glass lenses and plastic lenses formed by cast polymerization (to be referred to as "cast lenses" hereinafter), have extremely high impact strength and are therefore safe and highly functional, they are used as visual correction lenses, sunglasses and protective spectacles.

It is now strongly demanded that eyes should be protected from harmful ultraviolet rays by providing ultraviolet absorptivity to spectacle lenses. A coating layer having ultraviolet absorptivity is formed on the surface of a cast lens or glass lens to meet the above demand. However, the lenses obtained by the above coating method become expensive and yellowish. An ultraviolet absorbing agent is added before polymerization to manufacture a cast lens. However, the above method has problems such as the hindrance of polymerizability and the marked yellowing of the lens itself.

In contrast to this, in a polycarbonate resin spectacle lens, the polycarbonate resin itself has a certain measure of ultraviolet absorptivity on a short wavelength side, and ultraviolet absorptivity can be easily provided to the polycarbonate resin by adding an ultraviolet light absorber before melt-molding as it is a thermoplastic resin. Therefore, the addition of an ultraviolet light absorber having a long wavelength is proposed. However, a polycarbonate resin of the prior art can absorb ultraviolet radiation having a wavelength of up to 375 nm. To absorb ultraviolet radiation having a wavelength longer than this, the amount of the ultraviolet light absorber must be added in an amount 2 to 10 times larger than that of the prior art. Since the ultraviolet light absorber is generally sublimable, when a large amount of the ultraviolet light absorber is added, the ultraviolet light absorber sublimes and contaminates the mirror surface of a mold at the time of injection molding the polycarbonate resin and the appearance of the obtained lens is greatly impaired.

JP-B 06-035141 and JP-B 06-041162 disclose a method of forming a surface layer at the time of extrusion molding a multi-layer sheet or film by adding 0.1 to 20 parts by weight of an oligomer type ultraviolet light absorber which hardly sublimes in a polycarbonate resin. However, the purpose of this method is to provide weatherability to the sheet and not optical. There is an ultraviolet light absorber which can absorb ultraviolet radiation having a longer wavelength. Since the polycarbonate resin yellows markedly when this long wavelength absorbing ultraviolet light absorber is added, a large amount of a bluing agent must be added to remove the yellow color. However, as transparency is impaired and luminous transmittance is greatly reduced by the addition of the large amount of the bluing agent, a lens having a markedly dark color is provided.

Further, JP-A 07-092301 proposes a plastic lens which prevents the transmission of ultraviolet radiation and near infrared radiation by adding an ultraviolet light absorber and an infrared light absorber. However, the lens obtained by this method is unsatisfactory in terms of transparency.

Meanwhile, JP-A 62-146951 discloses a polycarbonate resin composition which is prepared by adding 0.001 to 5 parts by weight of an alkylidene bis(benzotriazolylphenol) compound represented by a specific structural formula to 100 parts by weight of a polycarbonate resin to improve light resistance. This publication shows the measurement results of a change ($\Delta$YI) in the yellowness index of each test specimen which was prepared by adding 0.30 wt % of each of the above five specific compounds to a polycarbonate resin and applying ultraviolet radiation to the test specimen from a high-pressure mercury lamp to measure the yellowness index of the specimen. The results merely show that a change in the yellowness index is reduced by the addition of the above specific compounds.

JP-A 04-292661 discloses a resin composition comprising 100 parts by weight of a transparent thermoplastic resin including a polycarbonate resin and 0.01 to 0.15 part by weight of an ultraviolet light absorber having an absorption maximum at a wavelength of 280 to 360 nm and no absorption at a wavelength of 400 nm. This resin composition has been developed for camera lenses having a transmittance for light having a wavelength of 400 nm of 80% or more as the sensitivity peak of a silver salt film is existent at a wavelength of 400 nm.

JP-A 09-263694 and JP-A 09-291205 disclose a resin composition comprising 100 parts by weight of a transparent thermoplastic resin including a polycarbonate resin and two ultraviolet light absorbers having absorption maximums at a wavelength of 300 to 345 nm and a wavelength of 346 to 400 nm. Although this composition has been developed for spectacle lenses having excellent transparency and high ultraviolet absorptivity, when heat history such as re-extrusion is applied to recycle product waste, a change in hue is large and molding heat resistance is unsatisfactory.

Further, JP-A 2003-231803, JP-A 2003-231804 and JP-A 2003-231805 disclose a resin composition comprising 100 parts by weight of an aromatic polycarbonate resin and 0.003 to 1 part by weight of a specific benzotriazole-based ultraviolet light absorber and a benzofurano-2-one type compound. Although this composition has improved balance among hydrolytic resistance, impact resistance and mold contamination, it is unsatisfactory in terms of hue and when heat history such as re-extrusion is applied, a change in hue is large and molding heat resistance is unsatisfactory.

The pamphlet of WO03/095557 discloses a composition comprising (a) a polycarbonate resin, (b) a specific full ester of an aliphatic polyhydric alcohol and an aliphatic carboxylic acid and (c) an ultraviolet light absorber. The polycarbonate resin composition disclosed by this document is unsatisfactory in terms of ultraviolet absorptivity required for spectacles lenses.

When a molded product is taken out from the mold, smooth releasability that prevents a scratch on the surface of a molded product is required as the quality of a spectacle lens. When a large amount of a release agent is added, adhesion between the molded product and a protective coat for preventing a scratch on the surface of the molded product becomes low due to the influence of the release agent remaining on the surface of the molded product, whereby the protective coat readily peels off. Therefore, a release agent which provides a release effect with a small amount is desired.

DISCLOSURE OF THE INVENTION

It is a first object of the present invention to provide a spectacle lens made of a polycarbonate resin composition which has molding heat resistance when the spectacle lens is formed by injection molding or extrusion compression molding, especially molding heat resistance that enables it to be kept at a high temperature for a long time, a small change in hue even when long heat history is applied and excellent releasability.

It is a second object of the present invention to provide a polycarbonate resin spectacle lens which has excellent impact resistance and transparency and can cut ultraviolet radiation having a specific wavelength almost completely.

It is a third object of the present invention to provide a spectacle lens made of a composition which is rarely yellowed by ultraviolet radiation and is free from the contamination of the mirror surface of a mold by the sublimation of an ultraviolet light absorber during molding.

It is a fourth object of the present invention to provide a spectacle lens which does not transmit a wavelength of 385 nm substantially and has a high total light transmittance.

It is a fifth object of the present invention to provide a polycarbonate resin molding material for optical moldings such as the above spectacle lens.

To attain the above objects, the inventors of the present invention have conducted intensive studies on an ultraviolet light absorber, a release agent and a heat stabilizer for use with a polycarbonate resin and have found that a spectacle lens which is excellent in release effect without impairing moldability, whose change in hue caused by molding heat is improved without impairing the transparency of the lens and which absorbs ultraviolet radiation having a wavelength of 385 nm almost completely can be obtained by using two specific ultraviolet light absorbers, a specific release agent and an optional specific heat stabilizer in a specific ratio. The present invention has been accomplished based on this finding.

That is, according to the present invention, there are provided the following spectacle lens and polycarbonate resin molding material for optical moldings.

1. A spectacle lens made of a polycarbonate resin composition which comprises (1) 100 parts by weight of a polycarbonate resin, (2) 0.05 to 0.5 part by weight of (A) at least one ultraviolet light absorber selected from the group consisting of 2-(2'-hydroxy-5'-methylphenyl)benzotriazole and 2-(2'-hydroxy-5'-tert-octylphenyl)benzotriazole, (3) 0.01 to 0.3 part by weight of (B) at least one ultraviolet light absorber selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazol)-2-ylphenol] and 2-[2-hydroxy-3,5-bis(α,α-dimethylbenzyl)phenyl]-2H-benzo triazole, and (4) 0.01 to 0.5 part by weight of (C) a full ester of a tetravalent to octavalent aliphatic polyhydric alcohol having 5 to 30 carbon atoms and an aliphatic carboxylic acid having 10 to 22 carbon atoms, having an acid value of 4 to 20.

2. The spectacle lens in the above paragraph 1, wherein the weight ratio of the above ultraviolet light absorber (B) to the above ultraviolet light absorber (A) in terms of (B)/(A) is in the range of 0.05 to 4.

3. The spectacle lens in the above paragraph 1, wherein the above ultraviolet light absorber (A) is 2-(2'-hydroxy-5'-tert-octylphenyl)benzotriazole and the above ultraviolet light absorber (B) is 2,2'-methylenebis[4-(1,1,3,3-tetramethylbutyl)-6-(2H-benzotriazol-2-ylphenol)].

4. The spectacle lens in the above paragraph 1, wherein the aliphatic carboxylic acid of the above full ester (C) contains a palmitic acid component and a stearic acid component, the total of the area (Sp) of the palmitic acid component and the area (Ss) of the stearic acid component is 80% or more of the total of all the aliphatic carboxylic acid components in its peak area measured by gas chromatograph-mass analysis (GC/MS method), and the area ratio (Ss/Sp) of the both components is 1.3 to 30.

5. The spectacle lens in the above paragraph 1, wherein the above full ester (C) has a 5% weight loss temperature measured by TGA (thermogravimetric analysis) of 250 to 360° C.

6. The spectacle lens in the above paragraph 1, wherein the above full ester (C) has an acid value of 4 to 18.

7. The spectacle lens in the above paragraph 1, wherein the above full ester (C) is a full ester of pentaerythritol and a mixed aliphatic carboxylic acid of palmitic acid and stearic acid.

8. The spectacle lens in the above paragraph 1, wherein the above full ester (C) is contained in an amount of 0.02 to 0.4 part by weight based on 100 parts by weight of the polycarbonate resin.

9. The spectacle lens in the above paragraph 1 which further contains a phosphorus-based heat stabilizer (d) in an amount of 0.001 to 0.2 part by weight based on 100 parts by weight of the polycarbonate resin.

10. The spectacle lens in the above paragraph 9, wherein the phosphorus-based heat stabilizer (d) is a phosphonite.

11. The spectacle lens in the above paragraph 1 which further contains a bluing agent (e) in an amount of $0.1 \times 10^{-4}$ to $6 \times 10^{-4}$ part by weight based on 100 parts by weight of the polycarbonate resin.

12. The spectacle lens in the above paragraph 1, wherein the polycarbonate resin contains 2,2-bis(4-hydroxyphenyl)propane as the main dihydric phenol component.

13. The spectacle lens in the above paragraph 1 which further contains a lactone-based heat stabilizer (f) represented by the following formula (1) in an amount of 0.0005 to 0.1 part by weight based on 100 parts by weight of the polycarbonate resin:

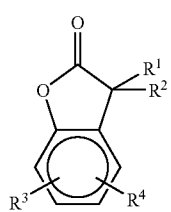

(1)

wherein $R^1$, $R^2$, $R^3$ and $R^4$ are each independently a hydrogen atom, alkyl group having 1 to 20 carbon atoms, aralkyl group having 7 to 20 carbon atoms or aryl group having 6 to 15 carbon atoms.

14. The spectacle lens in the above paragraph 1 which further contains a hindered phenol-based antioxidant (g) in an amount of 0.001 to 0.1 part by weight based on 100 parts by weight of the polycarbonate resin.

15. A polycarbonate resin molding material for optical moldings, which comprises (1) 100 parts by weight of a polycarbonate resin, (2) 0.05 to 0.5 part by weight of (A) at least one ultraviolet light absorber selected from the group consisting of 2-(2'-hydroxy-5'-methylphenyl)benzotriazole and 2-(2'-hydroxy-5'-tert-octylphenyl)benzotriazole, (3) 0.01 to 0.3 part by weight of (B) at least one ultraviolet light absorber selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazol)-2-ylphenol] and 2-[2-hydroxy-3,5-bis(α,α-dimethylbenzyl)phenyl]-2H-benzotriazole, and (4) 0.01 to 0.5 part by weight of (C) a full ester of a tetravalent to octavalent aliphatic polyhydric alcohol having 5 to 30 carbon atoms and an aliphatic carboxylic acid having 10 to 22 carbon atoms, having an acid value of 4 to 20.

16. A polycarbonate resin molding material for optical moldings, which comprises (1) 100 parts by weight of a polycarbonate resin, (2) 0.05 to 0.5 part by weight of 2-(2'-hydroxy-5'-tert-octylphenyl)benzotriazole, (3) 0.01 to 0.3 part by weight of 2,2'-methylenebis[4-(1,1,3,3-tetramethylbutyl)-6-(2H-benzotriazol)-2-ylphenol], (4) 0.01 to 0.5 part by weight of (C) a full ester of pentaerythritol and a mixed aliphatic carboxylic acid of palmitic acid and stearic acid, having an acid value of 4 to 20, and (5) 0.001 to 0.2 part by weight of a phosphorus-based heat stabilizer.

The present invention will be described in more detail hereinunder.

BEST MODE FOR CARRYING OUT THE INVENTION

The polycarbonate resin used in the present invention is an aromatic polycarbonate resin obtained by reacting a dihydric phenol with a carbonate precursor. Examples of the above dihydric phenol used herein include bis(hydroxyaryl)alkanes such as 2,2-bis(4-hydroxyphenyl)propane (generally referred to as "bisphenol A"), bis(4-hydroxyphenyl)methane, 1,1-bis(4-hydroxyphenyl)ethane, 2,2-bis(4-hydroxyphenyl}butane, 2,2-bis(4-hydroxyphenyl}octane, 2,2-bis(4-hydroxyphenyl}phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl}propane, 2,2-bis(4-hydroxy-3,5-dibromophenyl}propane and 2,2-bis(4-hydroxy-3,5-dichlorophenyl)propane; bis(hydroxyphenyl)cycloalkanes such as 1,1-bis(hydroxyphenyl)cyclopentane and 1,1-bis(hydroxyphenyl)cyclohexane; dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. These dihydric phenols may be used alone or in combination of two or more.

An aromatic polycarbonate resin comprising 2,2-bis(4-hydroxyphenyl)propane (bisphenol A) as the main dihydric phenol component out of the above dihydric phenol components is preferred, and an aromatic polycarbonate resin comprising bisphenol A in an amount of 70 mol % or more, especially 80 mol % or more of the total of all the dihydric phenol components is particularly preferred. An aromatic polycarbonate resin comprising a dihydric phenol component which is substantially bisphenol A is most preferred.

A brief description is given of basic means of manufacturing a polycarbonate resin. In the solution process using phosgene as the carbonate precursor, a reaction between a dihydric phenol component and phosgene is generally carried out in the presence of an acid binder and an organic solvent. The acid binder is selected from an alkali metal hydroxide such as sodium hydroxide or potassium hydroxide and an amine compound such as pyridine. The organic solvent is a halogenated hydrocarbon such as methylene chloride or chlorobenzene. To promote the reaction, a catalyst such as a tertiary amine or quaternary ammonium salt may be used. A terminal capping agent such as phenol or alkyl-substituted phenol, for example, p-tert-butylphenol is desirably used as a molecular weight control agent. The reaction temperature is generally 0 to 40° C., the reaction time is several minutes to 5 hours, and pH during the reaction is preferably maintained at 10 or more.

The transesterification process (melting process) using a carbonic acid diester as the carbonate precursor is carried out by stirring a dihydric phenol component and a carbonic acid diester in predetermined amount in the presence of an inert gas under heating and distilling off the formed alcohol or phenol. The reaction temperature which differs according to the boiling point of the formed alcohol or phenol is 120 to 350° C. in most cases. The reaction is carried out under reduced pressure from its initial stage to distill off the formed alcohol or phenol. A commonly used transesterification reaction catalyst may be used to promote the reaction. Examples of the carbonic acid diester used in the transesterification reaction include diphenyl carbonate, dinaphthyl carbonate, dimethyl carbonate, diethyl carbonate and dibutyl carbonate, out of which diphenyl carbonate is particularly preferred.

The molecular weight of the polycarbonate resin used in the present invention is preferably 17,000 to 30,000, particularly preferably 20,000 to 26,000 in terms of viscosity average molecular weight. The spectacle lens is a precision molded article and it is important that the mirror surface of a mold should be accurately transferred to provide a specific curvature and a specific index of refraction. Although a low-viscosity resin having high melt fluidity is desired, as impact strength which is the feature of a polycarbonate resin cannot be retained when its viscosity is too low, a polycarbonate resin having a viscosity average molecular weight within the above range is preferred. The viscosity average molecular weight (M) of the polycarbonate resin is obtained by inserting the specific viscosity ($\eta_{sp}$) of a solution containing 0.7 g of the polycarbonate resin dissolved in 100 ml of methylene chloride measured at 20° C. with an Ostwald viscometer into the following equation. $\eta_{sp}/c=[\eta]+0.45\times[\eta]^2 c$ ([η] represents an intrinsic viscosity)

$[\eta]=1.23\times10^{-4}M^{0.83}$ $c=0.7$

The resin composition in the present invention contains two different types of ultraviolet light absorbers in the above polycarbonate resin which differs in wavelength absorption properties. One of them is at least one ultraviolet light absorber (A) selected from the group consisting of 2-(2'-hydroxy-5'-methylphenyl)benzotriazole and 2-(2'-hydroxy-5'-tert-octylphenyl)benzotriazole. The ultraviolet light absorber (A) has an absorption maximum at a wavelength around 340 nm. The other is at least one ultraviolet light absorber (B) selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazol)-2-ylphenol] and 2-[2-hydroxy-3,5-bis(α,α-dimethylbenzyl)phenyl]-2H-benzotriazole. The ultraviolet light absorber (B) has an absorption maximum at a wavelength of 343 to 360 nm. The absorption maximums of these two different types of ultraviolet light absorbers are absorption spectra measured by using a chloroform solution having a concentration of 10 mg/liter and a quartz cell having a layer thickness of 10 mm.

When these two different types of ultraviolet light absorbers (A) and (B) are used alone, the absorption of ultraviolet radiation having a wavelength of 385 nm becomes unsatisfactory. When the ultraviolet light absorbers (A) and (B) are added in large quantities to achieve a satisfactory absorption, they sublime during molding, thereby increasing the haze or worsening the hue of the obtained lens. Even when the amounts of the above specific two different types of ultraviolet light absorbers (A) and (B) are relatively small, a molded plate having a thickness of 5 mm obtained by using a combination of the ultraviolet light absorbers (A) and (B) can absorb ultraviolet radiation having a wavelength of 385 nm almost completely with a spectral transmittance of 0.1% or less, has a 400 nm spectral transmittance of 50% or less, retains a total light transmittance of 87% or more and has a good hue as a lens. In addition, the molded plate has an advantage that it is rarely yellowed by ultraviolet radiation.

The above ultraviolet light absorber (A) is contained in an amount of 0.05 to 0.5 part by weight, preferably 0.1 to 0.4 part by weight, particularly preferably 0.1 to 0.35 part by weight based on 100 parts by weight of the polycarbonate resin. When the amount of the ultraviolet light absorber (A) is smaller than 0.05 part by weight, ultraviolet absorptivity becomes unsatisfactory and when the amount is larger than 0.5 part by weight, ultraviolet absorptivity does not improve any longer, and sublimation during molding, an increase in haze and the worsening of hue become marked.

The above ultraviolet light absorber (B) is contained in an amount of 0.01 to 0.3 part by weight, preferably 0.01 to 0.27 part by weight, particularly preferably 0.01 to 0.25 part by weight based on 100 parts by weight of the polycarbonate resin. When the amount of the ultraviolet light absorber (B) is smaller than 0.01 part by weight, ultraviolet absorptivity becomes unsatisfactory and when the amount is larger than 0.3 part by weight, hue significantly worsens, thereby obtaining a lens having a dark color.

As described above, one of the advantages obtained by using a combination of the ultraviolet light absorbers (A) and (B) in the present invention is that the amounts of these ultraviolet light absorbers can be reduced and the total amount of these ultraviolet light absorbers can also be reduced. That is, the amounts of the ultraviolet light absorbers (A) and (B) are as described above and the total amount of these is 0.1 to 0.3 part by weight, preferably 0.15 to 0.25 part by weight, particularly preferably 0.15 to 0.23 part by weight based on 100 parts by weight of the polycarbonate resin. Even when the total amount is small like this, ultraviolet radiation having a wavelength of 385 µm can be absorbed completely.

The mixing ratio (weight ratio) R represented by R=(B)/(A) of the ultraviolet light absorber (A) and the ultraviolet light absorber (B) is desirably set to a range of preferably 0.05 to 4, more preferably 0.05 to 3, much more preferably 0.05 to 2, particularly preferably 0.05 to 1.5. When the ratio R is lower than 0.05, ultraviolet absorptivity becomes unsatisfactory and when the ratio R is higher than 4, hue significantly worsens to an unpractical level.

In the composition of the present invention, a full ester (C) of an aliphatic polyhydric alcohol and an aliphatic carboxylic acid is used as a release agent.

The full ester (C) is a fatty acid full ester of a tetravalent to octavalent aliphatic polyhydric alcohol having 5 to 30 carbon atoms and an aliphatic carboxylic acid having 10 to 22 carbon atoms and has an acid value of 4 to 20. The full ester in the present invention does not always need to have an esterification degree of 100% and may have an esterification degree of 80% or more, preferably 85% or more.

In the present invention, when the acid value of the full ester (C) is 4 to 20, a polycarbonate resin composition having smaller release force (higher releasability) than that of the full ester of the prior art and excellent molding heat resistance can be obtained. When the acid value is smaller than 4, it is difficult to reduce release force and when the acid value is larger than 20, molding heat resistance becomes unpreferred. The acid value is more preferably 4 to 18, much more preferably 5 to 15. The main component showing the above acid value is a free aliphatic carboxylic acid (may be simply referred to as "free fatty acid" hereinafter) contained in the fatty acid full ester and therefore, an acid component such as a free fatty acid is existent in the fatty acid full ester (C) used in the present invention in an amount corresponding to the above acid value. The acid value is the amount (mg) of potassium hydroxide required to neutralize the free fatty acid contained in 1 g of a specimen and can be obtained by the method specified in JIS K 0070.

Preferably, the full ester (C) has a 5% weight loss temperature (may be simply referred to as "weight loss temperature" hereinafter) measured by TGA (thermogravimetric analysis) of 250 to 360° C.

When the weight loss temperature is higher than 360° C., it is difficult to reduce release force and when the weight loss temperature is too low, molding heat resistance becomes unsatisfactory, which may cause discoloration and a reduction in cracking resistance. Therefore, the weight loss temperature is preferably 250° C. or higher. The weight loss temperature is more preferably 280 to 360° C., much more preferably 300 to 350° C., particularly preferably 310 to 340° C.

The weight loss temperature is obtained as a temperature at which a 5% weight loss is observed under a measurement condition that the temperature is raised from 23° C. to 600° C. at a rate of 20° C./min in a nitrogen gas atmosphere in a TGA measurement apparatus.

The reason that the fatty acid full ester (C) which satisfies the above conditions can reduce release force (improvement of releasability) and improve molding heat resistance is unknown but considered as follows. The object measured by acid value is mainly an unreacted free carboxylic acid which is readily gasified during molding due to its relatively low molecular weight and separation on the surface of a molded product like above, thereby contributing to the improvement of releasability. Although the amount of volatile matter increases naturally to a certain extent, it is relatively small and the percentage of the volatile matter remaining on the mold at the time of releasing is small. Therefore, it is considered that the amount of a deposit on the mold does not increase. When the weight loss temperature is 360° C. or lower which is corresponding to the melt processing temperature of the polycarbonate resin, the aliphatic full ester (C) has high molding heat resistance and forms a certain amount of volatile matter. It is considered that the volatile matter gasifies during molding and readily separates at the end of a fountain flow formed when the resin is filled into the mold with the result that it separates on the surface of a molded product in a high concentration. Thereby, the further improvement of releasability is attained. Therefore, the acid value and the weight loss temperature have a certain measure of correlation. (when fatty acid full esters of the same type are compared with each other, as the acid value increases, the weight loss temperature becomes lower.)

Meanwhile, the gasified component may cause nonuniform friction force between resin fluidized beds and therefore, distortion in the inside of the molded product may increase. However, in the present invention, the full ester improves lubricity between the molecules of the polycarbonate as compared with a half ester. It is considered that even when a resin flow in the mold becomes complex, it becomes smooth and distortion in the inside of the molded product is reduced due to the above excellent effect. That is, it is supposed that when friction force between molecules is high, nonuniform friction force generated locally disturbs the resin flow and when the total friction force is low, its influence hardly appears. Further, it is assumed that distortion caused by the disturbance of the resin flow does not increase because the volatile matter is contained in a suitable amount and not a component which increases in a chain-like manner like a decomposed gas.

The full ester (C) itself has high chemical resistance and its attack on the polycarbonate resin is weak. It is considered that the cracking resistance of a molded product is thereby improved. It is considered that the effect of reducing the attack on the polycarbonate resin and suppressing the deterioration of the polycarbonate resin becomes marked by using a lactone-based heat stabilizer, a phosphorus-based heat stabilizer or a hindered phenol-based antioxidant which will be described hereinafter.

The fatty acid full ester (C) as used in the present invention is a general term for not only an ester compound itself but also a mixture of the ester compound and a free aliphatic carboxylic acid compound. Further, making use of the fact that the acid value and the weight loss temperature are changed by the amount of the free aliphatic carboxylic acid as described above, a fatty acid ester having a target acid value or weight loss temperature can be prepared by adding an aliphatic carboxylic acid to a fatty acid full ester having a low acid value or a high weight loss temperature. A fatty acid full ester which satisfies conditions under the present invention, can be also prepared by mixing two or more fatty acid esters having different acid values or different weight loss temperatures.

The method of manufacturing the above specific fatty acid full ester (C) is not particularly limited, and conventionally known methods may be employed to react an aliphatic polyhydric alcohol with an aliphatic carboxylic acid. To satisfy the specific conditions of the present invention, a method in which the aliphatic polyhydric alcohol and a slightly surplus aliphatic carboxylic acid is reacted and the reaction is completed in a relatively early stage is more preferred than a method in which a reaction between theoretical equivalents of the aliphatic polyhydric alcohol and the aliphatic carboxylic acid is completed perfectly over a plenty of time.

Examples of the reaction catalyst include sodium hydroxide, potassium hydroxide, barium hydroxide, calcium hydroxide, calcium oxide, barium oxide, magnesium oxide, zinc oxide, sodium carbonate, potassium carbonate and organic tin compounds such as 2-ethylhexyltin.

The polyhydric alcohol used in the manufacture of the fatty acid full ester is an aliphatic polyhydric alcohol having a valence (number of hydroxyl groups) of 4 to 8 and 5 to 30 carbon atoms. The valence of the aliphatic polyhydric alcohol is preferably 4 to 6 and the number of carbon atoms is preferably 5 to 12, more preferably 5 to 10. The aliphatic polyhydric alcohol may contain an ether bond in the carbon chain. Specific examples of the aliphatic polyhydric alcohol include pentaerythritol, dipentaerythritol, tripentaerythritol, polyglycerol (triglycerol to hexaglycerol), ditrimethylolpropane, xylitol, sorbitol and mannitol. Out of these, pentaerythritol and dipentaerythritol are preferred, and pentaerythritol is particularly preferred.

Examples of the aliphatic carboxylic acid having 10 to 22 carbon atoms used in the manufacture of the fatty acid full ester include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid and docosanoic acid, and unsaturated aliphatic carboxylic acids such as palmitoleic acid, oleic acid, linoleic acid, linolenic acid, eicosanoic acid, eicosapentaenoic acid and cetoleic acid. Out of these, aliphatic carboxylic acids having 14 to 20 carbon atoms are preferred. Saturated aliphatic carboxylic acids are more preferred. Stearic acid, palmitic acid and mixed aliphatic carboxylic acids thereof are particularly preferred.

Aliphatic carboxylic acids such as stearic acid and palmitic acid are generally manufactured from natural oils and fats such as animal oils and fats (beef tallow and lard) and vegetable oils and fats (such as palm oil). Therefore, aliphatic carboxylic acids such as stearic acid are generally mixtures containing another carboxylic acid component having a different number of carbon atoms. Stearic acid and palmitic acid manufactured from natural oils and fats and in the form of a mixture containing another carboxylic acid component are preferably used in the manufacture of the full ester (C) of the present invention. The ratio of the components of the mixture is preferably as follows.

That is, it is preferred that the aliphatic carboxylic acid constituting the full ester (C) contain a mixture of a palmitic acid component and a stearic acid component, the total of the area (Sp) of the palmitic acid component and the area (Ss) of the stearic acid component be 80% or more of the total of all the aliphatic carboxylic acids in the peak area measured by its thermally decomposed methylation GC/MS (gas chromatograph-mass analysis), and the area ratio (Ss/Sp) of the both areas be 1.3 to 30.

The thermal decomposition methylation GC/MS is a method of carrying out GC/MS measurement on a methyl ester derivative of a fatty acid formed by reacting a fatty acid full ester as a specimen with a methyl ammonium hydroxide as a reaction reagent on a pylofoil to decompose the fatty acid full ester.

The total of Sp and Ss is preferably 85% or more, more preferably 90% or more, much more preferably 91% or more of the total of all the aliphatic carboxylic acid components. Although the total of Sp and Ss can be made 100%, it is preferably 98% or less, more preferably 96% or less from the viewpoint of production cost. The above area ratio (Ss/Sp) is preferably 1.3 to 30, more preferably 1.3 to 10, much more preferably 1.3 to 4, particularly preferably 1.3 to 3. This mixing ratio does not need to be achieved with the aliphatic carboxylic acid alone and may be achieved with a mixture of two or more aliphatic carboxylic acids.

Examples of the oils and fats as raw materials for the aliphatic carboxylic acid which has the above mixing ratio include animal oils and fats such as beef tallow and lard, and vegetable oils and fats such as linseed oil, safflower oil, sunflower oil, soybean oil, corn oil, peanut oil, cotton seed oil, sesame-seed oil and olive oil. Out of these, animal oils and fats are preferred because they contain more stearic acid, and beef tallow is more preferred. Out of beef tallow, oleostearin which contains large amounts of saturated components such as stearic acid and palmitic acid is preferred.

The hydroxyl group value of the fatty acid full ester (C) is preferably small from the viewpoints of molding heat resistance and a reduction in release force. When it is too small, cost is boosted due to prolonged production time. The hydroxyl group value of the fatty acid full ester (C) is suitably 0.1 to 30, preferably 1 to 30, more preferably 2 to 20. The hydroxyl group value is the amount (mg) of potassium hydroxide required to neutralize acetic acid bonded to the hydroxyl group when 1 g of the specimen is acetylated and obtained by the method specified in JIS K 0070.

The iodine value of the fatty acid full ester (C) is preferably small from the viewpoint of molding heat resistance. The iodine value is preferably 10 or less, more preferably 1 or less. The iodine value is the amount (g) of iodine calculated from the amount of the bonded halogen when halogen is reacted with 100 g of the specimen and obtained by the method specified in JIS K 0070.

The amount of the fatty acid full ester (C) is 0.01 to 0.5 part by weight, preferably 0.02 to 0.4 part by weight, more preferably 0.05 to 0.3 part by weight based on 100 parts by weight of the polycarbonate resin. When the amount of the fatty acid full ester falls below the above range, the improvement of releasability is not satisfactory and cracking resistance lowers. When the amount of the fatty acid full ester exceeds the above range, the transparency of a molded product is impaired and cracking resistance may lower due to a reduction in molding heat resistance.

Further, the polycarbonate resin composition of the present invention has the effect of reducing a trace amount of a carbide formed in its molded product. Since the carbide scatters light according to the intensity of a light source or the angle of light, it may be seen as a white streak (white mist) in the molded product. Also in this respect, the polycarbonate resin composition of the present invention has preferred characteristic properties.

The timing and method of mixing the above two ultraviolet light absorbers and the fatty acid full ester (C) with the polycarbonate resin are not particularly limited. They may be mixed with the polycarbonate resin during polymerization, with a solution after polymerization, or with the polycarbonate resin in the form of a powder, pellet or bead by means of any mixers, such as a tumbler, ribbon blender or high-speed mixer to be melt kneaded. The ultraviolet light absorber (A) and the ultraviolet light absorber (B) may be added at the same time or in a desired order.

The polycarbonate resin composition of the present invention may contain 0.001 to 0.2 part by weight of a phosphorus-based heat stabilizer (d) based on 100 parts by weight of the polycarbonate resin. The phosphorus-based heat stabilizer is a phosphorous acid, phosphoric acid, phosphonous acid, phosphonic acid or ester thereof, as exemplified by triphenyl phosphite, tris(nonylphenyl)phosphite, tris(2,4-di-tert-butylphenyl)phosphite, tris(2,6-di-tert-butylphenyl)phosphate, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerithritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite.

Out of these, tris(2,4-di-tert-butylphenyl)phosphite, tris(2,6-di-tert-butylphenyl)phosphite, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite are preferred, and tetrakis(2,4-di-tert-butylphenyl)-4,4'-biphenylene diphosphonite is particularly preferred.

The above phosphorus-based heat stabilizer (d) is preferably a phosphonite, and tetrakis(2,4-di-tert-butylphenyl)-4,4'-biphenylene diphosphonite is desirably contained in an amount of preferably 30 wt % or more, more preferably 40 wt % or more of the total of all the phosphorus-based heat stabilizers (d).

When the polycarbonate resin composition of the present invention is molded into a spectacle lens, a bluing agent (e) can be used to remove a yellow tint of the lens based on the polycarbonate resin and the ultraviolet light absorbers. Any bluing agent (e) may be used without a problem if it is used for polycarbonate resins. In general, an anthraquinone-based dye which is easily acquired is preferred.

Specific examples of the bluing agent include Solvent Violet 13 (CA. No (color index No) 60725) such as Microlex Violet B (Trademark) of Bayer AG, Dia Resin Blue G of Mitsubishi Chemical Co., Ltd. and Sumiplast Violet B of Sumitomo Chemical Co., Ltd.; Solvent Violet 31 (CA. No 68210) such as Dia Resin Violet D (Trademark) of Mitsubishi Chemical Co., Ltd.; Solvent Violet 33 (CA. No 60725) such as Dia Resin Blue J (Trademark) of Mitsubishi Chemical Co., Ltd.; Solvent Blue 94 (CA. No 61500) such as Dia Resin Blue N (Trademark) of Mitsubishi Chemical Co., Ltd.; Solvent Violet 36 (CA. No 68210) such as Microlex Violet 3R (Trademark) of Bayer AG; Solvent Blue 97 such as Microlex Blue RR (Trademark) of Bayer AG; and Solvent Blue 45 (CA. No 61110) such as Polysinthrene Blue RLS (Trademark) of Sand AG. The bluing agent is generally used in an amount of $0.1 \times 10^{-4}$ to $6 \times 10^{-4}$ part by weight based on 100 parts by weight of the polycarbonate resin. When a too large amount of the bluing agent is used, the absorption of the bluing agent becomes strong and luminous transmittance lowers with the result that a lens having a dark color is obtained. Especially in the case of a spectacle lens for visual correction whose thickness greatly changes as it has a thick portion and a thin portion, when the absorption of the bluing agent is strong, a hue difference is seen between the central portion and the peripheral portion of the lens due to a difference in thickness, thereby obtaining a lens having a very poor appearance.

The polycarbonate resin composition of the present invention may contain a lactone-based heat stabilizer (f) represented by the following formula (1). Use of the lactone-based heat stabilizer (f) provides molding heat resistance that enables the composition to be kept at a high temperature for a long time when the polycarbonate resin composition is formed into a spectacle lens by injection molding or extrusion compression molding and reduces a hue change when heat history is applied.

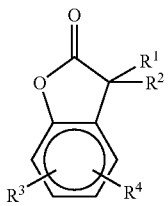

(1)

wherein $R^1$, $R^2$, $R^3$ and $R^4$ are each independently a hydrogen atom, alkyl group having 1 to 20 carbon atoms, aralkyl group having 7 to 20 carbon atoms or aryl group having 6 to 15 carbon atoms.

The alkyl group having 1 to 20 carbon atoms may be a linear or branched alkyl group. Examples of the alkyl group include methyl group, ethyl group, propyl group, isopropyl group, butyl group, isobutyl group, pentyl group, 2-ethylbutyl group, hexyl group, heptyl group, octyl group, 2-ethylhexyl group, nonyl group, decyl group, dodecyl group, tetradecyl group, octadecyl group and eicosyl group.

Examples of the aralkyl group having 7 to 20 carbon atoms include benzyl group, 2,6-di-tertiary-butyl-4-methylbenzyl group, phenethyl group, phenylpropyl group, napthylmethyl group and 2-phenylisopropyl group.

Examples of the aryl group having 6 to 15 carbon atoms include phenyl group, tolyl group and naphthyl group.

$R^1$ and $R^2$ are preferably a combination of a hydrogen atom and an aryl group having 7 to 20 carbon atoms. A combination of a hydrogen atom and a 3,4-dimethylphenyl group is particularly preferred.

$R^3$ and $R^4$ are each preferably an alkyl group having 1 to 20 carbon atoms, particularly preferably a tert-butyl group.

The lactone-based heat stabilizer (f) is used in an amount of 0.0005 to 0.1 part by weight, preferably 0.0005 to 0.05 part by weight, more preferably 0.0.005 to 0.012 part by weight based on 100 parts by weight of the above polycarbonate resin. When the amount of the lactone-based heat stabilizer is smaller than 0.0005 part by weight, the effect is small and satisfactory molding heat resistance cannot be obtained and when the amount is larger than 0.1 part by weight, the molding heat resistance of the resin deteriorates disadvantageously.

The polycarbonate resin composition of the present invention may contain a hindered phenol-based antioxidant (g) which is generally known and used to prevent oxidation. Examples of the hindered phenol-based antioxidant (g) include pentaerythritol tetrakis(3-mercaptopropionate), pentaerythritol tetrakis(3-laurylthiopropionate), glycerol-3-stearyl thiopropionate, triethylene glycol-bis[3-(3-tert-butyl-5-methyl-4-hydroxyphenyl) propionate], 1,6-hexanediol-bis [3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexamethylenebis(3, 5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl) propionyloxy]ethyl}-2,4,8,10-tetraoxaspiro(5,5)undecane, out of which octadecyl-3-(3,5-di-tert-butyl-4-hydroxyphenyl) propionate is particularly preferred. The amount of the antioxidant (g) is preferably 0.001 to 0.1 part by weight based on 100 parts by weight of the polycarbonate resin.

The spectacle lens made of the polycarbonate resin composition of the present invention is extremely excellent in transparency, and a 5 mm-thick molded plate of the polycarbonate resin composition has a total light transmittance of 87% or more, preferably 88% or more. The spectral transmittance at 385 nm of the 5 mm-thick molded plate is 1% or less, preferably 0.1% or less which means that it can absorb ultraviolet radiation having this wavelength almost completely. It has a spectral transmittance at 400 nm of 50% or less, preferably 40% or less which means that the possibility of its yellowing by ultraviolet radiation is extremely small.

The spectacle lens made of the polycarbonate resin composition of the present invention has high transparency and low yellowness. The 5 mm-thick molded plate has a yellowness index b* of preferably 0.3 to 1.6, more preferably 0.4 to 1.4. When this yellowness index (b*) is lower than 0.3, after the lens is molded, light transmitting therethrough becomes bluish and when the yellowness index is higher than 1.6, light transmitting therethrough becomes yellowish.

Further, in the evaluation of examples which will be described hereinafter, the difference $\Delta b^*$ (=b'*−b*) between the yellowness indices (b* and b'*) of 5 mm-thick molded plates obtained by molding a virgin pellet (first time of extrusion) and a repellet (third time of extrusion) continuously at a cylinder temperature of 300° C. with an injection molding machine is preferably 0.5 or less.

Also in the evaluation of examples which will be described hereinafter, the yellowness index ($b_{10}^*$) of a 5 mm-thick molded plate obtained by molding a virgin pellet (first time of extrusion) continuously at a cylinder temperature of 300° C. with an injection molding machine after 10 minutes of residence is preferably 1.5 or less.

The polycarbonate resin composition of the present invention is excellent in reproduction property and residence heat resistance and rarely changes its hue by heat.

As for the releasability of the polycarbonate resin composition of the present invention, in the evaluation of examples which will be described hereinafter, the release load is preferably 20 Mpa or less, more preferably 15 Mpa or less.

Since the spectacle lens of the present invention comprises a polycarbonate resin as a base material, it has high impact strength, a high refractive index and an excellent ultraviolet absorbing effect, especially the effect of absorbing harmful ultraviolet radiation having a wavelength of 385 to 400 nm.

To mold the above polycarbonate resin composition into a spectacle lens, a method known per se may be employed. More specifically, the spectacle lens of the present invention is formed by various moldings such as injection molding, compression molding, extrusion molding or injection compression molding a molding material (such as a pellet) obtained by melt extruding the above polycarbonate resin composition. Injection compression molding is preferred because a lens having little optical distortion can be molded at a high yield. For injection compression molding, preferably, the cylinder temperature is 250 to 320° C., and the mold temperature is 80 to 140° C.

A protective layer such as a hard coat, anti-reflection coat or anti-fogging coat may be formed on the surface of the spectacle lens made of the polycarbonate resin composition of the present invention.

EFFECT OF THE INVENTION

Since the spectacle lens obtained from the polycarbonate resin composition of the present invention has high releasability at the time of molding, rarely yellows even when it has heat history while it retains impact resistance, transparency and ultraviolet shielding performance, and has high reproduction property and excellent molding heat resistance, its industrial effect is remarkable.

EXAMPLES

The following examples are given to further illustrate the present invention. "Parts" means parts by weight, and evaluations were made by the following methods.

(1) Spectral transmittance: A virgin pellet obtained in each Example was molded and the obtained sample plate (70 mm in length×50 mm in width×5 mm in thickness) was measured at a wavelength of 300 to 500 nm with the U-4100 of Hitachi, Ltd.

(2) Total light transmittance and haze: A virgin pellet obtained in each Example was molded and the obtained sample plate (70 mm in length×50 mm in width×5 mm in thickness) was measured with a C light source and the NDH-2000 of Nippon Denshoku Co., Ltd. in accordance with JIS K-7361.

(3) Yellowness index (b*): A virgin pellet obtained in each Example was molded and the obtained sample plate (70 mm in length×50 mm in width×5 mm in thickness) was measured at a view angle of 2° with a C light source and the Color-Eye 7000A of Gretag Macbeth Co., Ltd.

(4) Molding heat resistance (reproduction property): The hues (b* and b'*) of sample plates (70 mm in length×50 mm in width×5 mm in thickness) obtained by molding a virgin pellet (first time of extrusion) and a repellet (third time of extrusion) obtained in Examples continuously at a cylinder temperature of 300° C. with an injection molding machine were measured with the Color-Eye700A of Gretamacbeth Co., Ltd. to obtain the degree of discoloration $\Delta b^* = (b'^* - b^*)$. As $\Delta b^*$ is smaller, the change in hue is smaller.

(5) Molding heat resistance (residence heat resistance) The color of a sample plate obtained by molding a virgin pellet (first time of extrusion) obtained in each Example at a cylinder temperature of 300° C. with an injection molding machine after 1 minute of residence and the hue ($b_{10}^*$) of a sample (70 mm in length×50 mm in width×5 mm in thickness) obtained by molding after 10 minutes of residence were measured with the Color-Eye700A of Gretamacbeth Co., Ltd. to obtain the degree of discoloration. As $b_{10}^*$ is smaller, the degree of discoloration is smaller.

(6) Releasability: A molded cup was molded with an injection molding machine to measure an ejection load (release stress) at the time of releasing with a 1-ton load cell memorizer. As this value is smaller, releasability is more excellent.

Ultraviolet light absorbers, release agents, heat stabilizers and antioxidants used in Examples and Comparative Examples are shown below with abbreviations.

Ultraviolet Light Absorbers

Component UV-1; 2-(2'-hydroxy-5'-tert-octylphenyl)benzotriazole

Component UV-2; 2,2'-methylenebis[4-(1,1,3,3-tetramethylbutyl)-6-(2H-benzotriazol-2-yl)phenol]

Component UV-3; 2-(3-tert-butyl-5-methyl-2-hydroxyphenyl)-5-chlorobenzotriazole

Release Agents

Component C-1; full ester of pentaerythritol and analiphatic carboxylc acid (comprising stearic acid and palmitic acid as main components) having an acid value of 9, a TGA 5% weight loss temperature of 322° C., a total of the area (Ss) of a stearic acid component and the area (Sp) of a palmitic acid component measured by the GC/MS method of 94% of the total of all the aliphatic carboxylic acid components, and an area ratio (Ss/Sp) of 1.44 (manufactured by Riken Vitamin Co., Ltd.: Rikestar EW-400, hydroxyl group value of 6, iodine value of 0.4, the aliphatic carboxylic acid is obtained from an animal oil and fat)

component C-2 (for comparison); stearic acid stearate (manufactured by Riken Vitamin Co., Ltd.: Rikemal SL-99, avid value of 1.8, hydroxyl group value of 4, iodine value of 0.6, TGA 5% weight loss temperature of 243° C.)

component C-3 (for comparison); full ester of pentaerythritol and an aliphatic carboxylic acid (comprising stearic acid and palmitic acid as main components) having an acid value of 1, a TGA 5% weight loss temperature of 390° C., a total of Ss and Sp of 91% of the total of all the aliphatic carboxylic acid components and an area ratio (Ss/Sp) of 1.11 (manufactured by Cognis Japan Co., Ltd.: Roxiol VPG-861, hydroxyl group value of 7, iodine value of 0, the aliphatic carboxylic acid is obtained from a vegetable oil and fat) component C-4 (for comparison); glycerin monofatty acid ester (manufactured by Riken Vitamin Co., Ltd.: Rikemal S-100A, acid value of 0.8, hydroxyl group value of 327, iodine value of 1.8, TGA 5% weight loss temperature of 205° C.)

Heat Stabilizers And Antioxidants component HS-1 (lactone-based heat stabilizer); 5,7-di-tert-butyl-3-(3,4-dimethyl-phenyl-3H-benzofuran-2-one) (the compound of the above formula (1) in which $R^1$ is a hydrogen atom, $R^2$ is a 3,4-dimethylphenyl group, and $R^3$ and $R^4$ are each a tert-butyl group)

component HS-2 (phosphorus-based heat stabilizer); tris(2,4-di-tert-butylphenyl)phosphite component HS-3 (hindered phenol-based antioxidant); octadecyl-3-(3,5-di-tert-4-hydroxyphenyl)propionate Example 1

0.3 part of 2-(2'-hydroxy-5'-tert-octylphenyl)benzotriazole (component UV-1 having an absorption maximum at 340 nm) as an ultraviolet light absorber, 0.04 part of 2,2'-methylenebis[4-(1,1,3,3-tetramethylbutyl)-6-(2H-benzotriazol-2-yl)phenol] (component UV-2 having an absorption maximum at 349 nm) as an ultraviolet light absorber, 0.05 part of a full ester of pentaerythritol and an aliphatic carboxylic acid (comprising stearic acid and palmitic acid as main components) (component C-1) as a release agent, 0.03 part of the following phosphorus-based heat stabilizer (d) and 0.5 ppm of a compound represented by the following formula (2) as a bluing agent were added to 100 parts of a polycarbonate resin powder having a viscosity average molecular weight of 22,400 obtained by the interfacial polymerization of bisphenol A and phosgene in accordance with a commonly used method and fully mixed together by a tumbler, and the resulting mixture was pelletized with a 30 mm vented extrusion molding machine at 260 to 280° C. (virgin pellet).

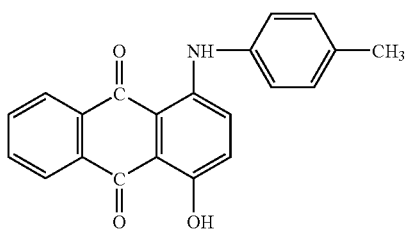

(2)

Further, pelletization was carried out twice continuously under the same extrusion conditions to obtain a repellet in order to check the hue of the repellet. These pellets were molded into sample plates (70 mm in length×50 mm in width×5 mm in thickness) at a cylinder temperature of 300° C. with an injection molding machine in accordance with the above evaluation methods. The b*, b'*, Δb* and $b_{10}$* values, haze, total light transmittance, spectral transmittances at 385 nm and 400 nm and release stress of these sample plates were measured, and the evaluation results are shown in Table 1.

The phosphorus-based heat stabilizer (d): a mixture of the following components d-1, d-2 and d-3 in a weight ratio of 71:15:14

Component d-1; a mixture of tetrakis(2,4-di-t-butylphenyl)-4,4'-biphenylene diphosphonite, tetrakis(2,4-di-t-butylphenyl)-4,3'-biphenylene diphosphonite and tetrakis(2,4-di-t-butylphenyl)-3,3'-biphenylene diphosphonite in a weight ratio of 100:50:10

Component d-2: a mixture of bis(2,4-di-tert-butylphenyl)-4-phenyl-phenyl phosphonite and bis(2,4-di-tert-butylphenyl)-3-phenyl-phenyl phosphonite in a weight ratio of 5:3

Component d-3: tris(2,4-di-tert-butylphenyl)phosphite

Examples 2 to 6 and Comparative Examples 1 to 11

Sample plates were obtained in the same manner as in Example 1 except that the types and amounts of the ultraviolet absorbers and release agent were changed as shown in Table 1. The evaluation results are shown in Table 1.

TABLE 1

| | Ultraviolet light absorber | | Release agent | | Molding heat resistance (reproduction property) hue | | | Residence heat resistance | | Total light transmittance | Spectral transmittance | | Release stress |
|---|---|---|---|---|---|---|---|---|---|---|---|---|---|
| | Type | Amount (parts) | Type | Amount (parts) | b* (Virgin) | b'* (Repellet) | Δb* | hue $b_{10}$* | Ha (%) | Tt(%) | 400 nm | 385 nm | Mpa |
| Ex. 1 | UV-1 UV-2 | 0.3 0.04 | C-1 | 0.050 | 0.60 | 1.09 | 0.49 | 0.80 | 0.09 | 88.5 | 33.0 | 0.02 | 12.4 |
| Ex. 2 | UV-1 UV-2 | 0.3 0.04 | C-1 | 0.200 | 0.62 | 1.33 | 0.71 | 0.87 | 0.09 | 88.4 | 33.2 | 0.02 | 7.0 |
| Ex. 3 | UV-1 UV-2 | 0.1 0.1 | C-1 | 0.050 | 0.74 | 1.25 | 0.51 | 1.24 | 0.17 | 88.5 | 29.3 | 0.01 | 12.6 |
| Ex. 4 | UV-1 UV-2 | 0.1 0.1 | C-1 | 0.200 | 0.80 | 1.53 | 0.73 | 1.32 | 0.21 | 88.3 | 29.3 | 0.01 | 7.3 |
| Ex. 5 | UV-1 UV-3 | 0.3 0.02 | C-1 | 0.050 | 0.63 | 1.18 | 0.55 | 0.82 | 0.11 | 88.2 | 15.3 | 0.01 | 12.1 |
| Ex. 6 | UV-1 UV-3 | 0.3 0.02 | C-1 | 0.200 | 0.67 | 1.40 | 0.73 | 0.89 | 0.12 | 87.6 | 15.6 | 0.01 | 7.1 |
| C. Ex. 1 | UV-1 UV-2 | 0.3 0.04 | C-2 | 0.050 | 0.63 | 1.19 | 0.56 | 0.84 | 0.09 | 88.5 | 33.1 | 0.02 | 19.0 |
| C. Ex. 2 | UV-1 UV-2 | 0.3 0.04 | C-2 | 0.200 | 0.71 | 1.52 | 0.81 | 1.02 | 0.21 | 87.6 | 33.0 | 0.02 | 9.0 |
| C. Ex. 3 | UV-1 UV-2 | 0.1 0.1 | C-2 | 0.200 | 0.86 | 1.71 | 0.85 | 1.48 | 0.36 | 88.3 | 29.3 | 0.01 | 9.4 |
| C. Ex. 4 | UV-1 UV-3 | 0.3 0.02 | C-2 | 0.200 | 0.79 | 1.62 | 0.83 | 1.26 | 0.29 | 88.0 | 15.3 | 0.01 | 9.1 |
| C. Ex. 5 | UV-1 UV-2 | 0.3 0.04 | C-3 | 0.050 | 0.62 | 1.20 | 0.58 | 0.95 | 0.19 | 87.7 | 33.1 | 0.02 | 24.0 |
| C. Ex. 6 | UV-1 UV-2 | 0.3 0.04 | C-3 | 0.200 | 0.65 | 1.39 | 0.74 | 0.99 | 0.20 | 87.6 | 33.0 | 0.02 | 13.0 |
| C. Ex. 7 | UV-1 UV-2 | 0.1 0.1 | C-3 | 0.200 | 0.83 | 1.67 | 0.84 | 1.48 | 0.36 | 88.3 | 29.3 | 0.01 | 13.6 |
| C. Ex. 8 | UV-1 UV-3 | 0.3 0.02 | C-3 | 0.200 | 0.70 | 1.38 | 0.68 | 1.26 | 0.29 | 88.0 | 15.3 | 0.01 | 13.3 |
| C. Ex. 9 | UV-1 UV-2 | 0.3 0.04 | C-4 | 0.050 | 0.65 | 1.62 | 0.97 | 1.63 | 0.24 | 88.2 | 33.0 | 0.02 | 11.6 |
| C. Ex. 10 | UV-1 UV-2 | 0.3 0.04 | C-4 | 0.200 | 0.74 | 2.02 | 1.28 | 2.55 | 0.38 | 87.1 | 33.0 | 0.02 | 6.1 |
| C. Ex. 11 | UV-1 UV-3 | 0.3 0.02 | C-4 | 0.200 | 0.83 | 1.99 | 1.16 | 2.44 | 0.35 | 87.0 | 15.3 | 0.01 | 6.0 |

Ex.: Example
C. Ex.: Comparative Example

Example 7

A sample plate was obtained in the same manner as in Example 1 except that 0.0027 part of 5,7-di-tert-butyl-3-(3,4-dimethyl-phenyl-3H-benzofuran-2-one) (component HS-1) was added as a lactone-based heat stabilizer. The evaluation results are shown in Table 2.

Examples 8 to 12 and Comparative Examples 12 to 17

Sample plates were obtained in the same manner as in Example 7 except that the types and amounts of the ultraviolet light absorbers and release agent were changed as shown in Table 2. The evaluation results are shown in Table 2.

Example 13

A sample plate was obtained in the same manner as in Example 1 except that 0.0005 part of 5,7-di-tert-butyl-3-(3,4-dimethyl-phenyl-3H-benzofuran-2-one) (component HS-1) was added and the amount of the full ester of pen-

TABLE 2

| | Ultraviolet light absorber | | Stabilizer | | Release agent | | Molding heat resistance (reproduction property) hue | | |
|---|---|---|---|---|---|---|---|---|---|
| | Type | Amount (parts) | Type | Amount (parts) | Type | Amount (parts) | $b^*$ (Virgin) | $b'^*$ (Repellet) | $\Delta b^*$ |
| Ex. 7 | UV-1 | 0.3 | HS-1 | 0.0027 | C-1 | 0.050 | 0.55 | 0.89 | 0.34 |
| | UV-2 | 0.04 | | | | | | | |
| Ex. 8 | UV-1 | 0.3 | HS-1 | 0.0027 | C-1 | 0.200 | 0.60 | 0.92 | 0.32 |
| | UV-2 | 0.04 | | | | | | | |
| Ex. 9 | UV-1 | 0.1 | HS-1 | 0.0027 | C-1 | 0.050 | 0.71 | 1.07 | 0.36 |
| | UV-2 | 0.1 | | | | | | | |
| Ex. 10 | UV-1 | 0.1 | HS-1 | 0.0027 | C-1 | 0.200 | 0.75 | 1.18 | 0.43 |
| | UV-2 | 0.1 | | | | | | | |
| Ex. 11 | UV-1 | 0.3 | HS-1 | 0.0027 | C-1 | 0.050 | 0.60 | 0.96 | 0.36 |
| | UV-3 | 0.02 | | | | | | | |
| Ex. 12 | UV-1 | 0.3 | HS-1 | 0.0027 | C-1 | 0.200 | 0.65 | 1.02 | 0.37 |
| | UV-3 | 0.02 | | | | | | | |
| C. Ex. 12 | UV-1 | 0.3 | HS-1 | 0.0027 | C-2 | 0.050 | 0.57 | 0.91 | 0.34 |
| | UV-2 | 0.04 | | | | | | | |
| C. Ex. 13 | UV-1 | 0.3 | HS-1 | 0.0027 | C-2 | 0.200 | 0.71 | 1.16 | 0.45 |
| | UV-2 | 0.04 | | | | | | | |
| C. Ex. 14 | UV-1 | 0.3 | HS-1 | 0.0027 | C-3 | 0.050 | 0.57 | 0.92 | 0.35 |
| | UV-2 | 0.04 | | | | | | | |
| C. Ex. 15 | UV-1 | 0.3 | HS-1 | 0.0027 | C-3 | 0.200 | 0.61 | 1.06 | 0.45 |
| | UV-2 | 0.04 | | | | | | | |
| C. Ex. 16 | UV-1 | 0.3 | HS-1 | 0.0027 | C-4 | 0.050 | 0.60 | 1.22 | 0.62 |
| | UV-2 | 0.04 | | | | | | | |
| C. Ex. 17 | UV-1 | 0.3 | HS-1 | 0.0027 | C-4 | 0.200 | 0.69 | 1.58 | 0.89 |
| | UV-2 | 0.04 | | | | | | | |

| | Residence heat resistance hue | Ha | Total light transmittance | Spectral transmittance | | Release stress |
|---|---|---|---|---|---|---|
| | $b_{10}^*$ | (%) | Tt(%) | 400 nm | 385 nm | Mpa |
| Ex. 7 | 0.72 | 0.09 | 88.5 | 33.0 | 0.02 | 12.4 |
| Ex. 8 | 0.79 | 0.09 | 88.3 | 33.0 | 0.02 | 7.0 |
| Ex. 9 | 1.22 | 0.16 | 88.6 | 29.3 | 0.01 | 12.6 |
| Ex. 10 | 1.28 | 0.19 | 88.5 | 29.3 | 0.01 | 7.3 |
| Ex. 11 | 0.81 | 0.10 | 88.2 | 15.3 | 0.01 | 12.1 |
| Ex. 12 | 0.85 | 0.10 | 88.0 | 15.3 | 0.01 | 7.1 |
| C. Ex. 12 | 0.76 | 0.09 | 88.5 | 33.0 | 0.02 | 19.0 |
| C. Ex. 13 | 0.93 | 0.18 | 87.6 | 33.0 | 0.02 | 9.0 |
| C. Ex. 14 | 0.91 | 0.19 | 87.7 | 33.0 | 0.02 | 24.0 |
| C. Ex. 15 | 1.03 | 0.12 | 87.6 | 33.0 | 0.02 | 13.0 |
| C. Ex. 16 | 1.56 | 0.15 | 88.4 | 33.0 | 0.02 | 11.6 |
| C. Ex. 17 | 2.03 | 0.23 | 87.5 | 33.0 | 0.02 | 6.1 |

Ex.: Example
C. Ex.: Comparative Example taerythritol and an aliphatic carboxylic acid (component C-1) was changed to 0.2 part. The evaluation results are shown in Table 3.

Examples 14 to 21 and Comparative Example 18

Sample plates were obtained in the same manner as in Example 13 except that the types and amounts of the ultraviolet light absorbers and stabilizer were changed as shown in Table 3. The evaluation results are shown in Table 3.

Example 22

A sample plate was obtained in the same manner as in Example 1 except that 0.3 part of 2-(2'-hydroxy-5'-tert-octylphenyl)benzotriazole (component UV-1) and 0.02 part of 2-(3-tert-butyl-5-methyl-2-hydroxyphenyl)-5-chlorobenzotriazole (component UV-3) as ultraviolet absorbers and 0.2 part of a full ester of pentaerythritol and an aliphatic carboxylic acid (component C-1) as a release agent were used and

TABLE 3

| | Ultraviolet light absorber | | Stabilizer | | Release agent | | Molding heat resistance (reproduction property) hue | | |
|---|---|---|---|---|---|---|---|---|---|
| | Type | Amount (parts) | Type | Amount (parts) | Type | Amount (parts) | $b^*$ (Virgin) | $b'^*$ (Repellet) | $\Delta b^*$ |
| Ex. 13 | UV-1 | 0.3 | HS-1 | 0.0005 | C-1 | 0.200 | 0.60 | 1.07 | 0.47 |
| | UV-2 | 0.04 | | | | | | | |
| Ex. 14 | UV-1 | 0.3 | HS-1 | 0.0027 | C-1 | 0.200 | 0.60 | 0.92 | 0.32 |
| | UV-2 | 0.04 | | | | | | | |
| Ex. 15 | UV-1 | 0.3 | HS-1 | 0.0100 | C-1 | 0.200 | 0.54 | 0.76 | 0.22 |
| | UV-2 | 0.04 | | | | | | | |
| Ex. 16 | UV-1 | 0.1 | HS-1 | 0.0100 | C-1 | 0.200 | 0.87 | 1.33 | 0.46 |
| | UV-2 | 0.15 | | | | | | | |
| Ex. 17 | UV-1 | 0.3 | HS-1 | 0.0500 | C-1 | 0.200 | 0.50 | 0.63 | 0.13 |
| | UV-2 | 0.04 | | | | | | | |
| Ex. 18 | UV-1 | 0.3 | HS-1 | 0.0100 | C-1 | 0.200 | 0.56 | 0.77 | 0.21 |
| | UV-2 | 0.04 | HS-2 | 0.0500 | | | | | |
| Ex. 19 | UV-1 | 0.3 | HS-1 | 0.0027 | C-1 | 0.200 | 0.59 | 0.89 | 0.30 |
| | UV-2 | 0.04 | HS-2 | 0.0100 | | | | | |
| | | | HS-3 | 0.0050 | | | | | |
| Ex. 20 | UV-1 | 0.3 | HS-1 | 0.0100 | C-1 | 0.200 | 0.55 | 0.74 | 0.19 |
| | UV-2 | 0.04 | HS-2 | 0.0500 | | | | | |
| | | | HS-3 | 0.0300 | | | | | |
| Ex. 21 | UV-1 | 0.3 | HS-1 | 0.0500 | C-1 | 0.200 | 0.48 | 0.60 | 0.12 |
| | UV-2 | 0.04 | HS-2 | 0.0500 | | | | | |
| | | | HS-3 | 0.0300 | | | | | |
| C. Ex. 18 | UV-1 | 0.5 | HS-1 | 0.0100 | C-1 | 0.200 | 0.52 | 0.64 | 0.11 |

| | Residence heat resistance hue $b_{10}^*$ | Ha (%) | Total light transmittance Tt(%) | Spectral transmittance 400 nm | Spectral transmittance 385 nm |
|---|---|---|---|---|---|
| Ex. 13 | 1.12 | 0.09 | 88.6 | 33.0 | 0.02 |
| Ex. 14 | 0.79 | 0.09 | 88.3 | 33.0 | 0.02 |
| Ex. 15 | 0.75 | 0.11 | 87.8 | 33.0 | 0.03 |
| Ex. 16 | 1.37 | 0.24 | 88.5 | 23.2 | 0.01 |
| Ex. 17 | 1.36 | 0.09 | 87.4 | 32.8 | 0.03 |
| Ex. 18 | 0.73 | 0.12 | 88.3 | 32.9 | 0.03 |
| Ex. 19 | 0.78 | 0.12 | 88.4 | 33.2 | 0.02 |
| Ex. 20 | 0.74 | 0.12 | 87.8 | 32.4 | 0.02 |
| Ex. 21 | 1.26 | 0.14 | 87.3 | 32.3 | 0.02 |
| C. Ex. 18 | 0.71 | 0.33 | 87.1 | 60.4 | 1.1 |

Ex.: Example

C. Ex.: Comparative Example 0.0027 part of 5,7-di-tert-butyl-3-(3,4-dimethyl-phenyl-3H-benzofuran-2-one) (component HS-1) was added. The evaluation results are shown in Table 4.

Examples 23 to 26 and Comparative Example 19

Sample plates were obtained in the same manner as in Example 22 except that the types and amounts of the ultraviolet light absorbers and stabilizer were changed as shown in Table 4. The evaluation results are shown in Table 4.

TABLE 4

| | Ultraviolet light absorber | | Stabilizer | | Release agent | | Molding heat resistance (reproduction property) hue | | |
|---|---|---|---|---|---|---|---|---|---|
| | Type | Amount (parts) | Type | Amount (parts) | Type | Amount (parts) | $b^*$ (Virgin) | $b'^*$ (Repellet) | $\Delta b^*$ |
| Ex. 22 | UV-1 | 0.3 | HS-1 | 0.0027 | C-1 | 0.200 | 0.65 | 1.02 | 0.37 |
| | UV-3 | 0.02 | | | | | | | |
| Ex. 23 | UV-1 | 0.3 | HS-1 | 0.0100 | C-1 | 0.200 | 0.60 | 0.82 | 0.22 |
| | UV-3 | 0.02 | | | | | | | |
| Ex. 24 | UV-1 | 0.3 | HS-1 | 0.0100 | C-1 | 0.200 | 0.54 | 0.66 | 0.12 |
| | UV-3 | 0.02 | HS-2 | 0.0500 | | | | | |
| Ex. 25 | UV-1 | 0.3 | HS-1 | 0.0027 | C-1 | 0.200 | 0.62 | 0.81 | 0.19 |
| | UV-3 | 0.02 | HS-2 | 0.0100 | | | | | |
| | | | HS-3 | 0.0200 | | | | | |
| Ex. 26 | UV-1 | 0.3 | HS-1 | 0.0100 | C-1 | 0.200 | 0.59 | 0.79 | 0.20 |
| | UV-3 | 0.02 | HS-2 | 0.0200 | | | | | |
| | | | HS-3 | 0.0500 | | | | | |
| C. Ex. 19 | UV-3 | 0.32 | HS-1 | 0.0100 | C-1 | 0.200 | 2.58 | 3.32 | 0.74 |

| | Residence heat resistance hue | Ha | Total light transmittance | Spectral transmittance | |
|---|---|---|---|---|---|
| | $b_{10}^*$ | (%) | Tt(%) | 400 nm | 385 nm |
| Ex. 22 | 0.85 | 0.1 | 88.0 | 15.3 | 0.01 |
| Ex. 23 | 0.77 | 0.08 | 88.2 | 15.0 | 0.01 |
| Ex. 24 | 0.71 | 0.09 | 88.2 | 15.2 | 0.01 |
| Ex. 25 | 0.80 | 0.12 | 87.8 | 15.5 | 0.01 |
| Ex. 26 | 0.77 | 0.13 | 88.5 | 14.9 | 0.01 |
| C. Ex. 19 | 2.94 | 0.18 | 87.0 | 0.16 | 0.01 |

Ex.: Example
C. Ex.: Comparative Example

The invention claimed is:

1. A spectacle lens made of a polycarbonate resin composition, which comprises:
   (1) 100 parts by weight of a polycarbonate resin,
   (2) 0.05 to 0.5 part by weight of 2-(2'-hydroxy-5'-tert-octylphenyl)benzotriazole as an ultraviolet light absorber (A),
   (3) 0.01 to 0.3 part by weight of 2,2'-methylenebis[4-(1,1,3,3-tetramethylbutyl)-6-(2H-benzotriazol)-2-ylphenol] as an ultraviolet light absorber (B), and
   (4) 0.01 to 0.5 part by weight of (C) a full ester of a tetravalent to octavalent aliphatic polyhydric alcohol having 5 to 30 carbon atoms and an aliphatic carboxylic acid having 10 to 22 carbon atoms, having an acid value of 4 to 20,
   wherein the weight ratio of the ultraviolet light absorber (B) to the ultraviolet light absorber (A) in terms of (B)/(A) is in the range of 0.05 to 1.5.

2. The spectacle lens according to claim 1, wherein the aliphatic carboxylic acid of the full ester (C) contains a palmitic acid component and a stearic acid component, the total of the area (Sp) of the palmitic acid component and the area (Ss) of the stearic acid component is 80% or more of the total of all the aliphatic carboxylic acid components in its peak area measured by gas chromatograph-mass analysis (GC/MS method), and the area ratio (Ss/Sp) of both components is 1.3 to 30.

3. The spectacle lens according to claim 1, wherein the full ester (C) has a 5% weight loss temperature measured by TGA (thermogravimetric analysis) of 250 to 360° C.

4. The spectacle lens according to claim 1, wherein the full ester (C) has an acid value of 4 to 18.

5. The spectacle lens according to claim 1, wherein the full ester (C) is a full ester of pentaerythritol and a mixed aliphatic carboxylic acid of palmitic acid and stearic acid.

6. The spectacle lens according to claim 1, wherein the full ester (C) is contained in an amount of 0.02 to 0.4 part by weight based on 100 parts by weight of the polycarbonate resin.

7. The spectacle lens according to claim 1, which further comprises a phosphorus-based heat stabilizer (d) in an amount of 0.001 to 0.2 part by weight based on 100 parts by weight of the polycarbonate resin.

8. The spectacle lens according to claim 7, wherein the phosphorus-based heat stabilizer (d) is a phosphonite.

9. The spectacle lens according to claim 1, which further comprises a bluing agent (e) in an amount of $0.1 \times 10^{-4}$ to $6 \times 10^{-4}$ part by weight based on 100 parts by weight of the polycarbonate resin.

10. The spectacle lens according to claim 1, wherein the polycarbonate resin contains 2,2-bis(4-hydroxyphenyl)propane as the main dihydric phenol component.

11. The spectacle lens according to claim 1, which further comprises a lactone-based heat stabilizer (f) represented by the following formula (1) in an amount of 0.0005 to 0.1 part by weight based on 100 parts by weight of the polycarbonate resin:

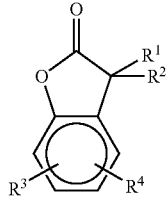

(1)

wherein $R^1$, $R^2$, $R^3$ and $R^4$ are each independently a hydrogen atom, alkyl group having 1 to 20 carbon atoms, aralkyl group having 7 to 20 carbon atoms or aryl group having 6 to 15 carbon atoms.

12. The spectacle lens according to claim 1, which further comprises a hindered phenol-based antioxidant (g) in an amount of 0.001 to 0.1 part by weight based on 100 parts by weight of the polycarbonate resin.

13. The spectacle lens according to claim 1, wherein the polycarbonate resin composition shows $\Delta b^* = (b'^* - b^*)$ of 0.5 or less, wherein $b^*$ is the hue of a sample plate obtained by molding a virgin pellet (first time of extrusion), and $b'^*$ is the hue of a sample plate obtained by molding a repellet (third time of extrusion), wherein the sample plates are molded at a cylinder temperature of 300° C. with an injection molding machine and the sample plates have a thickness of 5 mm.

* * * * *